United States Patent [19]

Mares et al.

[11] 4,219,625

[45] Aug. 26, 1980

[54] FLUORINATED POLYOL ESTERS

[75] Inventors: Frank Mares, Whippany; Bryce C. Oxenrider, Florham Park, both of N.J.; Cyril Woolf, deceased, late of Morristown, N.J., by Helga Woolf, executrix

[73] Assignee: Allied Chemical Corporation, Morris Township, Morris County, N.J.

[21] Appl. No.: 861,383

[22] Filed: Dec. 16, 1977

Related U.S. Application Data

[63] Continuation-in-part of Ser. No. 677,357, Apr. 15, 1976, abandoned, which is a continuation-in-part of Ser. No. 591,929, Jun. 30, 1975, abandoned.

[51] Int. Cl.$^2$ .................... C07C 69/80; C07C 69/82; C08G 63/76
[52] U.S. Cl. ......................... 525/5; 8/115.5; 525/437; 427/393.4; 428/395; 560/83; 560/86; 560/87; 528/272; 528/299
[58] Field of Search ............... 560/87, 86; 427/390 E; 528/299; 525/5, 437

[56] References Cited

U.S. PATENT DOCUMENTS

| | | | |
|---|---|---|---|
| 3,478,116 | 11/1969 | Smeltz | 560/87 |
| 3,646,153 | 2/1972 | Oxenrider et al. | 260/785 |
| 3,711,514 | 1/1973 | Quick | 260/346.3 |
| 3,870,748 | 3/1975 | Katsushima et al. | 560/87 |
| 3,959,229 | 5/1976 | Downing et al. | 260/75 H |
| 4,063,024 | 12/1977 | Sandler | 560/87 |

FOREIGN PATENT DOCUMENTS 241643 9/1960 Australia ................... 560/87

OTHER PUBLICATIONS

Mares et al, Book Pap., Natl. Tech. Conf.–Am. Assoc. Text. Chem. Color. 1975, pp. 270–276.
Mares et al, Fiber Prod. 1976, 4(2), 57, 59, 61.

*Primary Examiner*—Jane S. Myers
*Attorney, Agent, or Firm*—Robert A. Harman

[57] ABSTRACT

As an additive imparting oil and water repellency, durable against laundering and abrasion, to PET fibers: a partially or fully acylated polyol, especially pentaerythritol, glycerol, hydroquinone or ethylene glycol, acylated with a phthalic or terephthalic monoester having a perfluorinated alkyl or alkoxyalkyl $C_2$ to $C_{20}$ radical, especially $C_5$ to $C_{10}$ n-alkyl or $(CF_2)_nOR_f$ where $R_f$ is $C_1$ to $C_6$ perfluoroalkyl, especially perfluoroisopropyl and $(CF_2)_n$ is a straight chain $C_2$ to $C_{10}$ diradical.

16 Claims, No Drawings

FLUORINATED POLYOL ESTERS

REFERENCES TO RELATED APPLICATIONS

This application is a continuation-in-part of U.S. application Ser. No. 667,357 filed Apr. 15, 1976, now abandoned, which in turn is a continuation-in-part of then copending application Ser. No. 591,929 filed June 30, 1975, now abandoned.

BACKGROUND OF THE INVENTION

This invention relates to process and composition for the treatment of fibers, and more particularly to process and composition for imparting anti-soil properties to artificial fibers.

DESCRIPTION OF THE PRIOR ART

In the past, man-made fibers, such as nylon and polyethylene terephthalate, have found widespread use in home and industry as carpets, drapery material, upholstery and clothing. However, deficiencies in these fibers include a lack of water- and oil-repellency, as well as poor soil release properties. To extend the usefulness of the material, it has been sought to impart to these fibers properties that will enable them to resist soiling and to release such soil as is applied to the fabric, thereby decreasing the need for cleaning, while at the same time increasing the effectiveness of such cleaning operations as are in fact performed on the fabricated article.

Past efforts at imparting such soil resistant and soil release properties have concentrated on applying polymeric materials, such as polymers of acrylic and methacrylic esters containing perfluoroalkyl groups, to the fabricated article, usually as emulsions of the additive. However, fabricated textile products generally cannot be dyed after they have been coated with acrylic polymers containing perfluoroalkyl groups since the polymer coating acts as a barrier to penetration of the dye, thus removing the possibilities of a simplified process scheme in which the finish is applied prior to dyeing. Representative such polymeric finishes are disclosed in U.S. Pat. No. 3,171,861 of Mar. 2, 1965 to A. H. Ahlbrecht (e.g. Example 6) and in U.S. Pat. No. 3,514,487 of May 26, 1970 to L. G. Anello et al. (e.g. Examples 15, 17, 19–25). Certain monomeric water- and oil-repellent fluorinated compounds retaining "appreciable percentage of oil- and water-repellency after laundering or dry cleaning" are also disclosed in the above U.S. Pat. No. 3,171,861, e.g. quaternary ammonium salt derivatives of fluorinated alcohols, "fixed" by heating the impregnated cloth for 5 to 30 minutes at from 100° to 140° C. (Example 9 at Col. 13).

SUMMARY OF THE INVENTION

In accordance with the present invention, there are provided novel monomeric fluorocarbon additives for the improvement of fibers and articles fabricated therefrom. As used herein, the term "fibrous article" is intended to refer to monofilament fibers, fiber bundles and articles fabricated therefrom (e.g., textile fabrics), woven and nonwoven. These fiber additives are capable of providing oil repellency, water repellency or both to a fibrous article, particularly to such articles from polyethylene terephthalate, with various degrees of laundry stability and abrasion resistance, allowing the production of fibrous articles having a wide range of surface properties.

The compounds of the invention can be defined as a partially or fully acylated polyol compound, particularly the triply or quadruply acylated polyol, pentaerythritol, or the doubly or triply acylated polyol, glycerol, acylated to form polyester molecules containing at least two highly fluorinated alkyl or alkoxyalkyl mono ester moieties of phthalic or terephthalic acid, in which moieties a perfluorinated $C_2$ to $C_{20}$ radical is attached to a $C_2$ to $C_6$ alkylene diradical, attached in turn to one carboxy oxygen of phthalic or terephthalic acid.

Preferred perfluorinated radicals are n-alkyl, especially $C_5$ to $C_{10}$; or $(CF_2)_nOR_f$ where $R_f$ designates $C_1$ to $C_6$ perfluoroalkyl, particularly perfluoroisopropyl and $(CF_2)_n$ is a straight chain $C_2$ to $C_{10}$ diradical.

When the esterifying polyol is doubly acylated glycerol, the esterified mono ester is preferably a terephthalate; and/or a perfluorinated radical containing a straight chain of at least six perfluorinated carbon atoms is present in the compound.

When the perfluorinated radical is sufficiently long, i.e. contains a straight chain of at least six perfluorinated carbon atoms, the esterifying compound, instead of being pentaerythritol or glycerol, can be another polyol, particularly paradihydroxybenzene (i.e. hydroquinone), ethylene glycol, and the like.

The invention includes also fibers, especially of polyester such as polyethylene terephthalate ("PET") having a compound of the invention incorporated therein, whereby to impart oil and water repellency to such fiber, durable against abrasion and laundering.

These fluorocarbon chemicals can be applied to fibrous articles by several methods. In one method, the selected additive is intimately blended with resin and the blend then extruded to form a fiber having the selected additive incorporated therein. Subsequent heat treatment of the extruded fiber may be employed to further lower the surface tension of the fiber.

In a second method of the present invention, a fibrous article is contacted with the additive dissolved or dispersed in liquid medium. The liquid medium can be an organic solvent, especially a polar organic solvent, having the desired fluorocarbon additive dissolved therein. Alternatively, an aqueous emulsion or dispersion of the selected fluorocarbon additive dissolved in organic solvent can be used. Each of these alternative treatments is followed, in general, by annealing of the treated article.

It has been found by observation of fiber cross-sections under high magnification that the monomeric fluorocarbon additives of the present invention enter into the fiber surface and become an integral part of the fiber, in contrast to the non-compatible polymeric fluorocarbon chemicals of the prior art. Thus, while fibers obtained following treatment with the monomeric additives of the present invention may possess a concentration gradient of the additive, with the highest concentration of additive at the surface of the fiber, these fibers are more nearly homogeneous in composition. Thus, a fiber is produced which tends to retain its oil and stain resistant properties longer than fibers provided with a prior art polymeric fluorocarbon coating since the additive, once incorporated into the fiber surface, resists being abraded away with wear or laundering.

In addition, it has been surprisingly discovered that the fluorocarbon additives of the present invention do not prevent the fibrous articles from being dyed subsequent to the introduction of the additives into the fiber. Indeed, these additives have been found capable of being absorbed by a fibrous article from a dye bath, thereby resulting in a substantial reduction in processing and equipment costs which arise from the use of separate dyeing and oil/stain-proofing steps. Further, it has been observed that the additives of the present invention will not appreciably transfer from the treated fibrous article to an untreated fabric or fiber, thereby enabling laundering or further processing of fibrous articles treated in accordance with the process of the present invention.

Thus, the additives of the present invention may be incorporated into a fiber, yielding a modified fiber from which a desired fabricated article (e.g., a carpet) may be made as by use of such standard fiber processing steps as crimping, twisting, tufting, knitting, weaving, etc. without destroying the modified surface properties of the fiber.

DETAILED DESCRIPTION OF THE INVENTION

Suitable additives in the practice of this invention are:

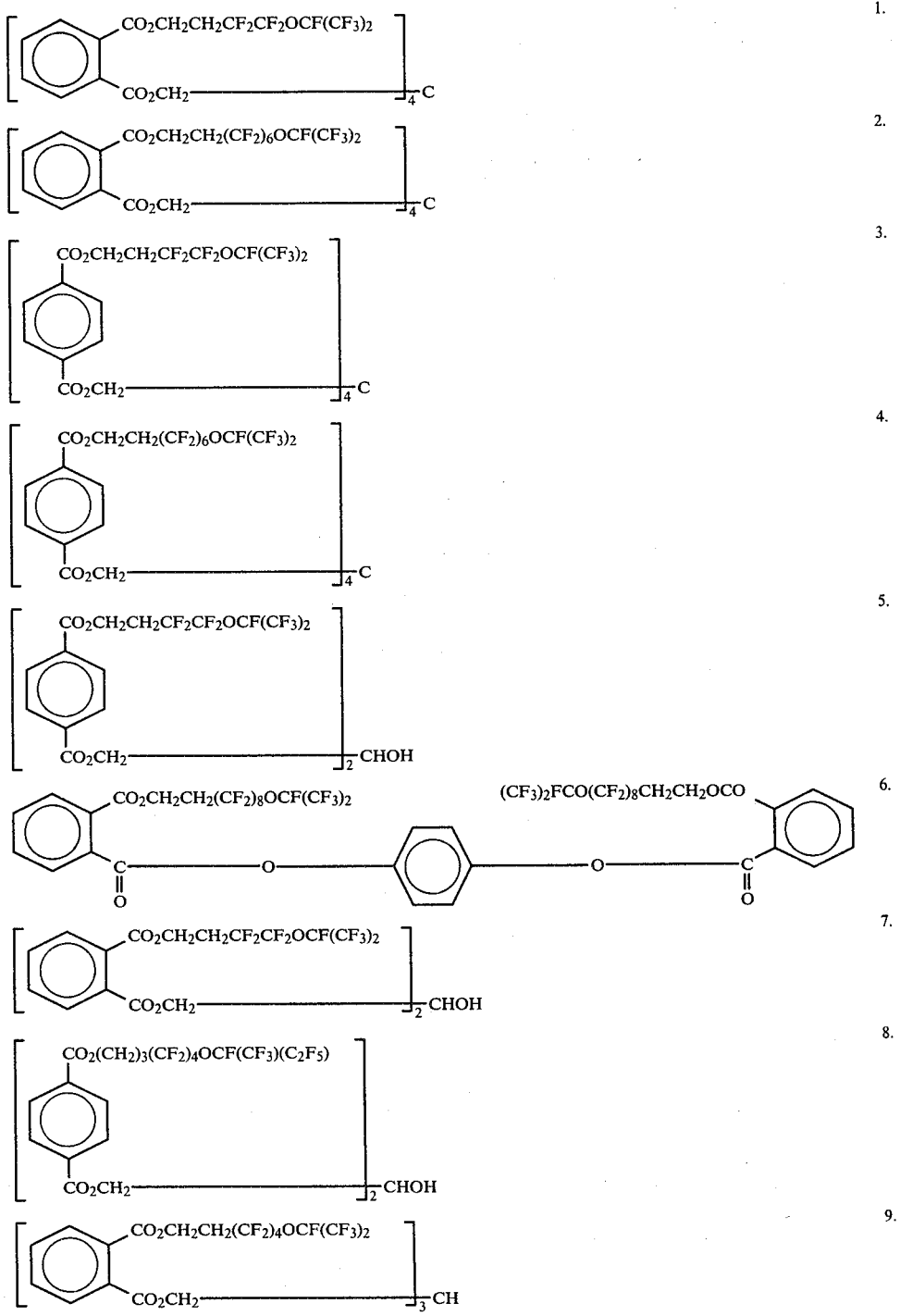

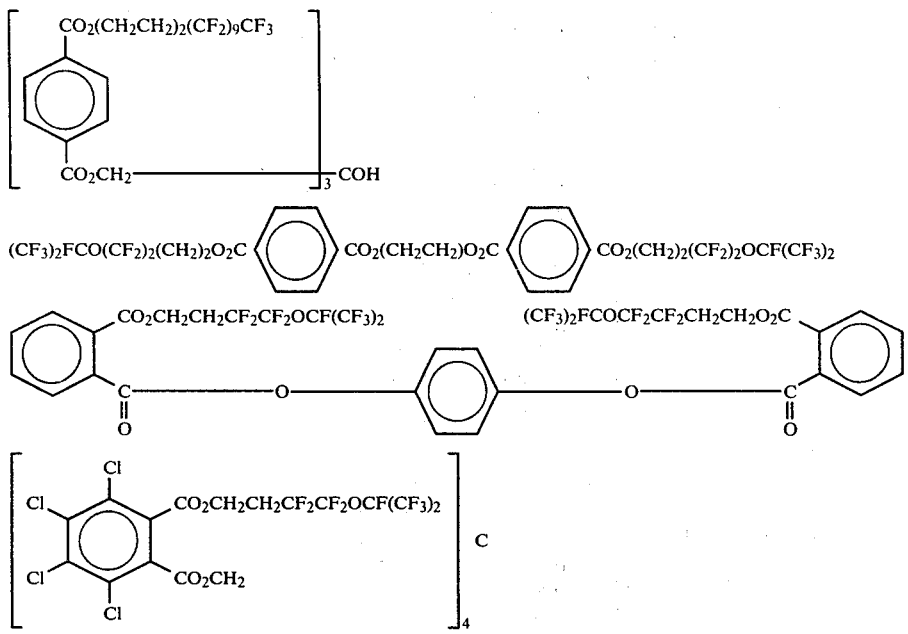

The additives can be obtained by standard techniques employing the corresponding phthalate monoester chloride or terephthalate monoester chloride. The desired phthalate or terephthalate monoester chloride can be reacted with the selected polyol under conditions as illustrated in the Examples below.

PREPARATION OF FIBERS

When it is desired that the selected additive of the present invention is incorporated into the appropriate resin prior to extrusion of the resin to form the fiber, the filaments of this invention can be prepared by forming an intimate blend of the additive and the resin, and then extruding the blend into filaments in accordance with methods known to the art. A method of forming the blend is not critical. The blend can be formed by treating the resin in powder form with a solution of the additive and then flash evaporating the solvent. Also, pellets of resin can be treated with a solution of the additive followed by evaporation of the solvent. The pellets with additive incorporated thereon may be then extruded to form a fiber or first extruded and again pelletized. Another method of forming the blend comprises dry blending the additive with the resin in powder form and then working the mixture on a rubber mill or similar device. The additive is preferably, however, added directly to the resin melt in the extruder.

While the quantity of additive incorporated into the resin prior to extrusion thereof may vary widely depending on the degree of surface tension lowering desired, the particular additive and resin selected for use, the extrusion temperature and other factors, additives of the present invention are generally employed in the resin in an amount of up to about 3 percent by weight, preferably from about 0.01 to 2.5 percent by weight, and most preferably from about 0.1 to 1 percent by weight of the resin.

The incorporation of these additives into the resin does not interfere with the formation of the filament or fibers drawn therefrom and the compatible additives do not disturb the normal microscopic homogeniety of the polymer phase. This is surprising in view of the critical rheological conditions involved in the extrusion of filaments.

In some instances, the surface energy of the filament can be lowered even further by annealing the filament after it has been extruded and drawn. Annealing increases the mobility of the additive and allows additional additive to migrate to the surface of the filament. To minimize the time requirement, annealing will be carried out at the highest practical temperature, which is normally above the glass transition temperature of the fiber and below the lower of (1) the fiber degradation temperature and (2) the additive degradation temperature. The degradation temperature of a given additive can be readily determined by routine experimentation, as by thermogravimetric analysis.

Annealing can be performed in an inert atmosphere, such as nitrogen, to prevent oxidative degradation of the fiber, but can also be performed in air, as in a circulating air oven. Alternatively, the surface energy of the fiber may be lowered by other conventional treatments, such as by treating the fiber with steam, for example, at a temperature of from about 100° to 220° C., boiling the fiber in water or boiling the fiber in an aqueous solution containing up to 1 weight percent of a swelling agent for the fiber, such as any of the carrier solvents typically employed in dyeing the fiber, e.g. methyl salicylate for polyethylene terephthalate fibers.

The extruded fiber can be dyed or further processed as for example by tufting, weaving, texturizing, crimping, etc. to produce a fabricated article having the desired low energy surface properties. Dyeing of the fiber or of an article fabricated therefrom has been found not to be adversely affected by the presence of the additive in the fiber, and level dyeing is observed. Use of a conventional swelling agent and/or dye bath temperatures greater than about 75° C. are preferable to enhance the rate of absorption of the dye by the fibrous article.

In a second general process of incorporating an additive of this invention with a fiber, the selected additive is applied to a fibrous article from liquid medium under conditions sufficient to allow the additive to be absorbed into the fiber. Subsequently, the fibrous article can be heat treated as by annealing, contacting with steam or boiling in a suitable solvent, to develop the fiber surface and to achieve the desired surface energy. The amount of additive to be incorporated into the fibrous article by this method is not critical and may vary widely depending upon the additives selected, the desired lowering of surface energy sought, the fiber, and other factors. Generally, however, additive is absorptively incorporated into a fibrous article in an amount of up to about 2.5 percent by weight, preferably from about 0.01 to 2 percent by weight of the article and most preferably from about 0.1 to 1 percent by weight of the article. Thus, the quantity of additive that is contained in the liquid medium will generally be sufficient to provide a fibrous article having the additive incorporated therein in the above amounts, e.g. up to about 2.5 percent by weight of the fibrous article.

The additive can be applied to the fiber before, during or after the application of a spin finish to the fiber and before or after crimping or texturizing of the fiber.

Absorption of the selected additive into the fibrous article can be achieved by several methods. Thus, the article can be contacted with an organic solvent having the additive dissolved therein, or with an aqueous emulsion or dispersion of the additive. The amount of additive incorporated into the liquid medium for contact of the fibrous article may vary widely depending upon the additive, fiber, the fiber properties desired, and other factors. Generally, however, the additive is incorporated into the liquid medium in an amount of from about 0.1 to 50% by weight, and most preferably from about 0.5 to 10% by weight. The temperature of the liquid medium used to treat the article is also not critical. Typical it may be from 0° to 50° C. The time of treatment is largely a matter of convenience and can range from less than one second up to 3 hours. The liquid medium containing the selected additive and the fibrous article can be contacted by any standard method employed in the industry to contact a liquid and fiber or article fabricated therefrom. Thus, the liquid can be applied by a roll to a fiber, or the article can be sprayed with the selected liquid medium or immersed therein.

When an aqueous emulsion or dispersion is selected for use, the aqueous medium is prepared by employing a suitable emulsifying or dispersing agent.

The liquid medium used in such emulsion or dispersion can contain a polar organic solvent of the additive and can also contain such carrier solvents or swelling agents as are typically employed in the industry to aid dyeing of the fibrous article which is being treated. Such carrier solvents typically enhance the ability of the additive to penetrate the fiber, thereby increasing the efficiency with which the fiber absorbs the additive. Thus, where a polyethylene terephthalate fiber, or article fabricated therefrom, is to be treated with an additive of the present invention, the commercial solvents sold under the trademarks Carolid, Charlab RP-3, Tanarol and Latyl and methyl salicylate can be employed as carrier solvents in the liquid medium to accelerate the rate of absorption by the fiber of the additive contained in this medium. Carrier solvents are employed in conventional amounts.

When it is desired to employ an organic solution of the additive, the organic solvent selected will, of course, depend upon the solubilities of the solvent for the additive. Suitable organic solvents, which may be easily determined by routine experimentation, include: ethers (e.g. dioxane); ketones (e.g. acetone); and alcohols (e.g. isopropanol). Carrier solvents as above noted can be used together with such organic solvents.

The aqueous and organic liquid mediums can contain a dye to enable concurrent dyeing and additive absorption. The dye selected is not critical and dyes such as dispersed dyes (e.g. Resolin Blue FBLB and Nacelan Blue FFRN (C.I. Disperse Blue Three) have been found quite satisfactory. The quantity of dye employed is not critical, and may be used in the amounts conventionally employed to obtain the desired shade. Use of a suitable conventional swelling agent and/or dye bath temperature greater than about 75° C. is preferred to enhance the absorption of the dye by the fibrous article.

Following treatment of the fibrous article with the selected liquid medium, the article may be optionally air dried and then subjected to a heat treatment in order to achieve further lowering of the surface tension of the untreated article and/or enhanced durability of the modified fiber surface to wear, home laundering and dry cleaning. The heat treatments, in general, can be performed by treating as with steam at temperatures of from about 100° to about 220° C., by heating the article in water or in an aqueous emulsion of carrier solvent, e.g. methyl salicylate for polyethylene terephthalate, at temperatures up to the boiling point of the liquid, or by annealing the fibrous article in a circulating or static air oven at a temperature of from about 90° to 230° C., and preferably from about 120° to 150° C. The time of such heat treatment is generally from about 1 to 240 minutes.

The Examples which follow are illustrative of our invention and of the best mode contemplated by us of practicing our invention but are not to be interpreted as limiting. Temperatures in these Examples are in °C.

EXAMPLE 1

Preparation of Additive No. 1

(A) A mixture of phthalic anhydride powder (29.6 g, 0.2 mole) and 4-perfluoroisopropoxy-3,3,4,4-tetrafluorobutanol (66 g., 0.2 mole) is heated 10 hours at 110°–120°. The crude product is poured into a solution of $Na_2CO_3$(24 g) in water (2 l.). The resulting solution if filtered, washed with benzene and acidified. The acidified solution is extracted with chloroform. The organic layer is washed twice with water and dried over $MgSO_4$. Evaporation of chloroform in vacuum yields 93.3 g (96.5%) of the monoester: mono(4-perfluoroisopropoxy-3,3,4,4-tetrafluorobutyl) phthalate; m.p. 64°–68°. Crystallization from n-haptane affords 85.2 g (88.2%) of the pure product; m.p. 67°–68°, nmr $\delta$12.3 (1H,s,), $\delta$7.5–8.2 (4H,m), $\delta$4.65(2H,t), $\delta$2.6(2H,t of t). Evaporation of solvent from the mother liquid results in 12.2 g of an oil which crystallizes on standing. The crystals are found to be a mixture of the monoester and bis(4-perfluoroisopropoxy-3,3,4,4-tetrafluorobutyl)phthalate. For monoester $C_{15}H_9O_5F_{11}$ (478.2) Calc. 37.67%C, 1.90% H, 43.7%F, 2.09 meg. of $CO_2H/g$. Found: 37.23%C, 2.09%H, 45.8%F, 1.98 meq. $CO_2H/g$.

(B-1) A mixture of thionyl chloride (80 ml) and the monoester of Part (A) above (60 g, 0.126 mole) is heated 3 hours to 80°, at which point the heating is stopped and the mixture stirred overnight. Thionyl chloride is then distilled off in vacuum, causing crystals of phthalic anhydride to appear. The product is dissolved in n-hexane and the crystals (1.1 g) are filtered off. The solvent is then evaporated and the acid chloride formed is dissolved in dioxane (80 ml). This solution is then treated with a solution of pentaerythritol (4.27 g, 0.0314 mole) is pyridine (60 ml), and the resulting mixture heated 15 hours at 80°. Most of the pyridine and dioxane is then evaporated in vacuo, and the residue is poured into water. The organic layer is dissolved in ether, and the ester layer is washed successively with diluted HCl (1:1), water, $Na_2CO_3$ solution, and dried over $MgSO_4$. Evaporation of ether in vacuum gives 59.1 g (95.2%) of oil which crystallized on standing; nmr: δ7.5 (16H,m) δ4.5 (16H,t), δ2.4 (8H,m). Per elemental analysis, the product is the desired phthalic ester compound No. 1 of the above list, contaminated with about 5% of the above noted bis-ester of phthalic acid.

(B-2) In an alternative procedure, a mixture of the monoester (20 g, 0.042 mole), pentaerythritol (1.42 g, 0.0104 mole) and trifluoroacetic anhydride (20 ml) is stirred about one hour at room temperature, until homogeneous. The excess of trifluoroacetic anhydride and acid is distilled off in vacuum, and the residue is dissolved in benzene and then washed with 10% NaOH solution. The product obtained (21.5 g, 100%) has essentially the same IR and nmr spectra as the product prepared by the first method; nmr δ7.7 (16H,m), δ4.7 (16H,t), δ2.6 (8H,m).

EXAMPLE 2

Preparation of Additive No. 2

(A) A mixture of 8-perfluoroisopropoxy-1,1,2,2-tetrahydroperfluorooctanol (20 g, 0.030 mole) and phthalic anhydride (5.6 g, 0.0378 mole) is heated 20 hours at 110°. The crude product (monoester) is crystallized from benzene yielding 20.9 g of the pure product, m.p. 67°–69°, 1.46 meq. of $CO_2H/g$ (theory 1.475 meq. of $CO_2H/g$), IR: 2500–3300 $cm^{-1}$ (OH and CH), 1740 $cm^{-1}$, 1680 $cm^{-1}$ (C=O), 990 $cm^{-1}$ (C-F); nmr: δ11.8 (1H,S), δ7.4–8.2 (4H,m), δ4.7 (2H,t), and δ2.7 (2H,t of t).

(B) A mixture of this monoester (19.2 g, 0.0283 mole), pentaerythritol (0.89 g, 0.00655 mole), and trifluoroacetic anhydride (20 ml) is stirred 3 hours at 30°. Employing isolation procedure described in Example 1 (B-2) yields 14.09 g (77.5%) of the desired phthalic ester, nmr: δ7.6 (16H,m), δ4.65 (16H,t), δ2.6 (8H,t of t), unreacted $CH_2OH$ groups δ3.8 (2H).

EXAMPLE 3

Preparation of Additive No. 3

(A) A solution of KOH (25.6 g, 0.456 mole) in 4-perfluoroisopropoxy-3,3,4,4-tetrafluorobutanol (see U.S. Pat. No. 3,514,487 above cited, Ex. 18) (300 ml) is added to an efficiently stirred solution of bis(4-perfluoroisopropoxy-3,3,4,4-tetrafluorobutyl) terephthalate (398.1 g, 0.504 mole) in the above alcohol (300 ml). When the temperature decreases to 34°, ether (500 ml) is added in order to facilitate stirring. The mixture is refluxed 6 hours. The desired precipitated potassium salt of the terephthalate monoester is filtered off, washed by ether and dried in vacuum oven at 60°/0.2 mm Hg. There is isolated 207.8 g (80%) of the salt. For $C_{15}H_8O_5F_{11}K$ (516.3) Calc: 34.89% C, 1.56% H, 60.48% F; Found: 34.51% C, 1.53% H, 40.4% F.

Distillation of the filtrate in vacuum yields the fluoroisopropoxybutyl alcohol and a residue (90 g) which on standing crystallized. The residue is mixed with ether and the insoluble part filtered off, affording additional 0.5 g of the salt. The ether filtrate is evaporated in vacuo, and the residue is crystallized from methanol. The starting ester (87 g, 20%), m.p. 45°–47° is recovered.

The potassium salt (218 g) is ground and dispersed in dry ether (400 ml). To the suspension, cooled by a water bath, a solution of dry HCl (16.5 g) in ether (120 ml) is added. The mixture is refluxed during the addition. It is then stirred 2 hours at room temperature. The ether solution is washed with water until pH 7 is reached and then dried over $MgSO_4$. Evaporation of ether yields the monoester (200 g, 99%), m.p. 155°–6°; IR; 1680 and 1720 $cm^{-1}$ (CO), 1100–1200 $cm^{-1}$, 990 $cm^{-1}$ (C-F), 800 $cm^{-1}$ (C-H p-substitution); nmr: δ8.2 (4H,s), δ4.67(2H,t), δ2.62 (2H,t of t); For $C_{15}H_9O_5F_{11}$ (478.2) Calc: 37.67% C, 1.90% H, 43.7% F, 2.09 meq. $CO_2H/g$; Found: 37.96% C, 1.89% H, 42.9% F, 2.10 meq. $CO_2H/g$.

(B) The above terephthalate monoester (20 g, 0.042 mole) and thionyl chloride (40 ml) are stirred overnight and then heated to 80° until all the solid monoester dissolves. The heating is continued two hours. Excess thionyl chloride is evaporated and the residue (esterchloride) is mixed with a solution of pentaerythritol (1.41 g, 0.0104 mole) in pyridine (20 ml). After five hours of stirring and heating to 80° (bath) the mixture is cooled, pyridine distilled off in vacuum, and water added. The solid precipitate is dissolved in benzene. The benzene layer is then washed, dried and evaporated. The crude product, crystallized from n-heptane, affords 21.2 g (100%) of the desired pure product, m.p. 96°–97°; nmr: δ8.1 (16H,s), δ4.55 (16H,m), δ2.6(8H,t of t); For $C_{65}H_{40}F_{44}O_{20}$ (1977); Calc: 39.48% C, 2.04% H, sap. no. 228; Found: 39.02% C, 2.49% H, Sap. No. 239.

EXAMPLE 4

Preparation of Additive No. 4

(A) A mixture of potassium benzyl terephthalate (19.5 g, 0.0665 mole), (prepared from dibenzyl terephthalate and KOH in benzyl alcohol) and thionyl chloride (60 ml) is stirred and refluxed 2 hours. The excess of thionyl chloride is evaporated in vacuo, and the residue extracted with ether. The undissolved precipitate of KCl is filtered off under $N_2$. Evaporation of ether yields 16.3 g (89.2%) of a chloride intermediate.

(B) A solution of 8-perfluoroisopropoxy-1,1,2,2-tetrahydroperfluorooctanol (28 g, 0.044 mole) and pyridine (3.5 g, 0.0445 mole) in dioxane (30 ml) is added to a solution of the acid chloride intermediate (12.2 g, 0.044 mole) in dioxane (30 ml). When the exothermic reaction ceases, the mixture is refluxed 2 hours and then poured on ice. The resulting crystals are recovered by filtration, washed with water and dried in vacuo. The crystals are found to comprise crude benzyl(8-perfluoroisopropoxy-1,1,2,2-tetrahydroperfluorooctyl) terephthalate (44.21 g).

(C) A solution of this terephthalate ester in dioxane (200 ml) is hydrogenated at room temperature and 30 psi of $H_2$ over 3 g Pd on alumina. In 20 minutes 1.1 liter of $H_2$ is consumed (theory 1.0 l.) The reaction is continued one hour longer, but no more $H_2$ is consumed. The resulting crystals are dissolved in refluxing dioxane and the catalyst is filtered off. The volume of dioxane is then reduced to 100 ml by distillation and the ester, mono (8-perfluoroisopropoxy-1,1,2,2-tetrahydroperfluorooctyl) terephthalate (26.3 g, 88.2% yield on the alcohol), crystallizes out; m.p. 177°–8°; IR: 1680 and 1710 $cm^{-1}$ (CO) 1100–1200 cm$^{-1}$, 985 cm$^{-1}$ (C-F); nmr: δ8.0 (4H,s), δ4.53 (2H,t), δ2.53 (2H,t of t); 1.47 meq. CO$_2$H/g (theory 1.475 meq. CO$_2$H/g).

(D) A mixture of this ester (15.0 g, 0.0221 mole) and thionyl chloride (60 ml) is refluxed 3 hours. The excess of thionyl chloride is evaporated, and the residue is treated with a solution of pentaerythritol (0.75 g, 0.0055 mole) in pyridine (30 ml). The resulting mixture is heated 15 hours to 80° (bath). After cooling, it is poured on ice. The crystals are filtered off and after drying, recrystallized from toluene, affording pure terephthalic ester additive No. 4 (15.7 g, 100%), m.p. 95°; IR: 1740 cm$^{-1}$ (C=O), 1100 cm$^{-1}$, 995 cm$^{-1}$, 730 cm$^{-1}$ (C-F); nmr: δ8.06 (16H,s), δ4.7 (16H,m); δ2.7 (8H,t of t); For C$_{81}$H$_{40}$F$_{76}$O$_{20}$ Calc: 35.03 %C, 1.45 %H, 52.00 %F; Found: 34.87 %C, 1.35 %H, 52.10 %F.

EXAMPLE 5

Preparation of Additive No. 5

Ester-chloride (20 g, 0.042 mole) prepared as above in Example 3(B) from the terephthalate monoester and thionyl chloride (30 ml) are mixed with a solution of glycerol (2.02 g, 0.022 mole) in pyridine (20 ml). The mixture is stirred one hour. Ether (50 ml) is added to facilitate stirring. After two hours, the mixture is extracted successively with dilute HCl, 10% Na$_2$CO$_3$, and water. The ether layer is dried. Evaporation of ether affords 18.1 g (85.2%) of crystals; nmr: δ7.92(8H,s), δ4.6(8H,t), δ2.55 (4H, t of t). For C$_{35}$H$_{26}$F$_{22}$O$_{12}$(1012.5) Calc: 39.14 %C, 2.19 %H, sap. no. 222, Found: 39.05 %C, 2.20 %H, sap. no. 239. Acidification of Na$_2$CO$_3$ extract yielded 2.2 g (11%) of the monoester starting material.

EXAMPLE 6

Preparation of Additive No. 6

(A) A mixture of methacrylates of formula (CF$_3$)$_2$CFO(CF$_2$)$_n$CH$_2$CH$_2$OCOC(CH$_3$)=CH$_2$ having 73% with n=6 and 27% n=8, (432 g)—which can be obtained by the general method of U.S. Pat. No. 3,514,487 above cited (see e.g. Ex. 17, Ex. 23)—was added to a solution of KOH (40 g) in methanol (500 ml). In order to prevent polymerization, p-phenylene diamine (10 g) was added. The mixture was stirred overnight at room temperature. Methanol was evaporated in vacuum and precipitated potassium acrylate was filtered off. The filtrate was distilled. The crude product did not show any C=O peak in the ir spectrum. Distillation on a spinning band column yielded 232.5 g of the fluoro alcohol with n=6, b.p. 52°/0.1 mm Hg (10-perfluoroisopropoxy-1,1,2,2-tetrahydroperfluorodecanol). The distillation residue was contaminated with p-phenylene diamine. It was dissolved in ether, extracted three times with diluted HCl and water. The ether layer was dried and the solvent evaporated in vacuum. The residue was distilled yielding 70.8 g of the fluoro alcohol with n=8, contaminated by about 5% of the lower alcohol.

(B) A mixture of the above 10-perfluoroisopropoxy-1,1,2,2-tetrahydroperfluorodecanol (20 g, 0.0324 mole) and phthalic anhydride (4.7 g, 0.0324 mole) is heated for 20 hours in a 110° bath. The crude product, crystallized from benzene, affords 21.8 g of the desired phthalate monoester, m.p. 85°–88°; ir: 2500–3300 cm$^{-1}$ (OH and CH), 1740 cm$^{-1}$, 1680 cm$^{-1}$ (C=O), 1100–1200 cm$^{-1}$, 990 cm$^{-1}$ (C-F); For C$_{21}$H$_9$O$_5$F$_{23}$ (778.3) Calc: 32.41% C, 1.16% H; 1.285 meq. CO$_2$H/g; Found: 32.33% C, 1.25% H, 1.29 meq. CO$_2$H/g.

(C) The above phthalate monoester (12.1 g, 0.0155 mole) and hydroquinone (0.86 g, 0.00782 mole) are stirred 3 hours at 30° in 20 ml of trifluoroacetic anhydride. By distilling off excess trifluoroacetic acid in vacuo and proceeding as in the above Example 1 (B-2), the product of Formula No. 6 above is obtained in 100% yield. (12.7 g); m.p. 94°–95°; nmr; δ7.5–8.2 (8H,m), δ7.4 (4H,s), δ4.7 (4H,t of t); For C$_{48}$H$_{20}$F$_{46}$O$_{10}$ (1630.6) Calc: 35.35%C, 1.24%H, 53.59%F, Found: 35.28%C, 1.03%H, 52.3%F.

TREATMENT OF FIBROUS ARTICLES

In the following tests, dip-coating of fabric is performed by dipping the fabric sample into a solution of an additive in dioxane solution at such a concentration that 0.1 to 0.2% by weight of fluorine is contained on the fabric. The fabric is then air dried and annealed at 150° C. for a period of 3 minutes in a circulating air oven.

Oil repellency of the fabric is then measured employing the scale (0 to 8) established by the American Association of Textile Chemists and Colorists in its publication "Technical Manual of the AATCC", volume 46 (Research Triangle Park, N.C.) (1970): AATCC Test No. 118–1966.

A home laundry (HL) cycle, in the tests below, is defined to be one washing in a heavy duty, 6-cycle automatic washer (Sears Kenmore) using a 12 minute hot (40° C.) wash cycle with one cup of Dash detergent (manufactured by Procter & Gamble). The washing is done at a constant load of 3 pounds and with a double rinse. Samples are dried for 30 minutes in an automatic dryer (Sears Kenmore) at a temperature of from 80° to 85° C.

Table 1

Dip-coating tests are performed on polyethylene terephthalate cloth samples (Dacron 54, fine weave, 100 sq. inch samples) to determine the oil repellency imparted to the fiber yielding the data summarized in Table 1 below. The untreated cloth sample used as control is found to have an oil repellency rating of 0. Tests No. 6–10 show results substantially below those of the earlier numbered tests, indicating importance of such factors as para vs. ortho orientation, number of hydroxyl groups acylated, and length of perfluorinated straight chain.

TABLE 1

| Test No. | Additive | Melting Point (°C.) | % Fluorine | Oil Repellency |
|---|---|---|---|---|
| 1 | 1 | oil | 0.14 | 4 |
| 2 | 2 | oil | 0.17 | 6 |
| 3 | 3 | 96–97 | 0.14 | 6 |
| 4 | 5 | oil | 0.14 | 6 |
| 5 | 6 | 94–95 | 0.18 | 6 |
| 6 | 7 | oil | 0.14 | 1 |
| 7 | 13 | oil | 0.14 | 2 |
| 8 | 12 | 69–71 | 0.13 | 1 |
| 9 | 11 | 101–102 | 0.18 | 2 |
| 10 | 11 | 101–102 | 0.30 | 3 |

Table 2

To determine the ability of fibers to absorb additives from an aqueous emulsion, additives are emulsified at a concentration of 0.002 g/ml in an aqueous solution containing 0.002 g/ml NACCONOL (a sulfonated alkylbenzene detergent formerly manufactured by Allied Chemical Corp.) by introducing the additive to the solution with continuous stirring at the boiling temperature (about 100° C.) of the solution. In each run, a 5 sq. inch cloth sample (Dacron 54, fine weave) fabricated from polyethylene terephthalate fiber is immersed in 250 ml. of the boiling solution containing the selected additive for a period of 1 or 2 hours without the presence in the solution of any carrier solvent. The cloth samples are then carefully rinsed in hot water and annealed for 5 minutes at 180° C. Testing of these samples shows a marked improvement in oil repellency for the treated samples over the control. These data are summarized in Table 2.

TABLE 2

| Example | Additive | Boiling Time (hrs.) | Oil Repellency |
|---------|----------|---------------------|----------------|
| 14 | 1 | 2 | 5 |
| 15 | 3 | 1 | 6 |
| 16 | 12 | 2 | 3 |
| Control | — | 1 | 0 |

Table 3

To determine the ability of fibers to absorb the additives of the present invention from an aqueous dispersion employed as a component of a dye bath, dispersions are prepared comprising about 30 weight percent of Marasperse N (manufactured by American Can Co.) or Tamol (manufactured by Rohm and Haas Co.) as dispersing agent; about 30 weight percent of water; about 20 weight percent of additive No. 3 of the present invention; from about 5 to 10 weight percent of sorbitol or GRANAX (manufactured by GAF Corporation) as humectant and from about 2 to 10 weight percent of IGEPAL (nonionic surface active agent manufactured by GAF Corporation) or fatty acid soap as a composition with synergistic effect in forming a dispersion. The dispersion is prepared by adding the additive to the other constituents and boiling the aqueous solution with continuous stirring. Fluorine analysis of a sample of the dispersion thus produced shows it to contain 17.6 weight percent additive.

Dye baths having varying concentrations of additive are then prepared by admixing from about 0.007 to 0.05 gram of the aqueous additive dispersion with approximately 50 grams of water, about 0.01 gram of dye paste (Polynol Yellow), 1 ml of 10% aqueous NaH$_2$PO$_4$ solution and from about 0.05 to 0.1 gram of o-phenylphenol type solvent (manufactured under the trademark Carloid by Tanatex) as carrier solvent. A 1 g. sample of polyethylene terephthalate fabric (Dacron 54, fine weave) is immersed in the selected dye bath for a period of one hour while boiling the dye bath at a temperature of 100° C. The cloth sample is then removed, dried to remove some of the water and then annealed at a temperature of 150° to 180° C. for a period of 2 minutes. The concentration of additive present on the treated cloth is determined by analysis and is compared to the concentration of additive remaining in the bath following treatment of the cloth. The exhaustion of the additive from the dye bath is found to vary from 70 to 90% by weight of initial content of additive in the bath. The data thereby obtained are summarized in Table 3 below:

The dyeing by this procedure, omitting the annealing step, is sometimes spotty. We theorize that this effect is caused by carrier solvent remaining in the cloth. The annealing after dyeing helps to obtain uniform dyeing and higher oil repellency.

TABLE 3

| Additive in Dye Bath[1] (Wt. %) | Additive on Cloth Sample (Wt. %) | Percent Exhaustion of Additive from Bath |
|---|---|---|
| 0.35 | 0.26 | 74 |
| 0.50 | 0.43 | 86 |
| 0.84 | 0.80 | 95 |
| 0.84 | 0.73 | 87 |
| 1.6 | 1.1 | 69 |

[1]Percentage relative to the weight of cloth sample

HOME LAUNDRY STABILITY

In order to determine the stability of the low energy surface developed by absorption of an additive from an additive dispersion followed by annealing, cloth samples of polyethylene terephthalate fiber (Dacron 54, fine weave) are prepared containing varying amounts of additive, expressed as weight percent fluorine. The additive selected for use is the terephthalic ester additive No. 3. Each sample is subjected to a number of home laundry cycles, and the oil repellency of the samples is determined following the completion of the desired number of cycles. The data thereby obtained demonstrate that the oil repellency is initially 100 (on a scale of 50 when the fabric repels only pure Nujol liquid paraffin, to 150 when it repels pure n-heptane and intermediate values corresponding linearly to increasing the heptane proportion). The repellency remains at about 70–80 even after the samples are subjected to as much as 40 home laundry cycles, using 0.05–1.05 weight percent additive on weight of fabric. Following completion of the above tests, the cloth samples are thoroughly rinsed with hot running water and then ironed at 150° C. with a standard home iron. For all samples, the oil repellency is thereby brought to 90, indicating that the starting repellency is essentially restored by removal of residual detergent and then annealing.

On dry cleaning, additive No. 3 is found to be removed substantially completely from PET cloth, and oil repellency is lost completely.

Table 4

A 100 square inch sample cloth fabricated from polyethylene terephthalate fiber (either Dacron 54, coarse weave or Dacron 56, double knit) is treated with a dioxane solution containing dissolved therein the terephthalic ester derivative No. 3. The cloth is contacted with the dioxane solution at a temperature of 25° C. for a sufficient period of time to incorporate the desired quantity of additive into the cloth. The cloth is then removed from the solution and annealed at a temperature of about 230° C. for about 2½ minutes, and then tested to determine the initial oil repellency, abrasion resistance and water repellency ratings. Oil repellency is rated as for the tests of Table 1; water repellency is by AATCC Test No. 22-1967 on a scale of 0–100. A rating of 70–90 is good and 90–100 is outstanding. Abrasion resistance is rated as oil repellency remaining after using a "Crock Meter" device (Type CM-5 of Atlas Electric Devices Co.) in which sandpaper bears for 20 strokes against stretched fabric.

The samples are subjected to a number of home laundry cycles, with the oil repellency, abrasion resistance and water repellency ratings being again determined after 5 and 15 HL cycles. Test results are set forth in Table 4 below. The results show the cloth samples treated with the additive of the present invention to compare favorably in oil repellency, abrasion resistance and water repellency ratings to the commercially available fluorocarbon compounds.

TABLE 4

| Fluoro-carbon Compound | %F | Initial Oil Rep. | Initial Abr Res. | Initial H$_2$O Rep. | After 5 Laundry Cycles Oil Rep. | After 5 Laundry Cycles Abr Res. | After 5 Laundry Cycles H$_2$O Rep. | After 15 Laundry Cycles Oil Rep. | After 15 Laundry Cycles Abr Res. | After 15 Laundry Cycles H$_2$O Rep. |
|---|---|---|---|---|---|---|---|---|---|---|
| RUN NO. 1: DACRON 54, COARSE WEAVE, UNSCOURED | | | | | | | | | | |
| No. 3 Additive: | 0.05 | 5 | 2 | 75 | 5 | 4 | 70 | 3 | 1 | 70 |
| | 0.10 | 6 | 4 | 80 | 5 | 5 | 75 | 4 | 2 | 70 |
| | 0.25 | 5 | 5 | — | 5 | 5 | — | 5 | 3 | — |
| SCOTCHGARD* | 0.1 | 6 | 4 | 80 | 5 | 3 | 80 | 4 | 3 | 80 |
| FC 321* | 0.2 | 6 | 6 | 80 | 5 | 4 | 80 | 5 | 4 | 80 |
| RUN NO. 2: DACRON 56, DOUBLE KNIT | | | | | | | | | | |
| No. 3 Additive: | 0.05 | 5 | 4 | 75 | 3 | 2 | 60 | 2 | 0 | 50 |
| | 0.10 | 6 | 4 | 80 | 5 | 4 | 79 | 3 | 1 | 60 |
| SCOTCHGARD* | 0.1 | 6 | 5 | 85 | 5 | 4 | 80 | 4 | 2 | 80 |
| FC 321* | 0.2 | 6 | 5 | 90 | 5 | 4 | 80 | 4 | 2 | 80 |

Oil Rep. = oil repellency rating; Abr. Res. = abrasion resistance rating; and H$_2$O rep. = water repellency rating.
*These are commercial products produced by 3M Co.; cloth samples are prepared using the manufacture's recommended procedures.

Table 5

Cloth samples of Dacron 54, coarse weave, are prepared as for the tests of Table 4 to incorporate therein the selected quantity of the desired fluorocarbon compound. Each sample is then subjected to a soil release test employing salad oil and a soiling mixture. The results thereby obtained are summarized in Table 5.

TABLE 5

| Fluorocarbon Compound | %F | 1st HL Soiling Mixture* | 1st HL Salad Oil | 2nd HL Soiling Mixture* | 2nd HL Salad Oil |
|---|---|---|---|---|---|
| Untreated Control | | 2.5 | 2.5 | 3.5 | 3.5 |
| No. 3 Additive | 0.05 | 2.5 | 2.5 | 3 | 3 |
| | 0.10 | 2 | 2 | 2 | 2 |
| | 0.25 | 2 | 2 | 2 | 2 |
| Scotchgard | 0.1 | 2 | 2 | 2.5 | 2.5 |
| FC 321 | 0.2 | 2 | 2 | 2.5 | 2.5 |

*Soiling Mixture:
3 Parts Mustard 2 Parts Ketchup 2 Parts Mayonnaise 1 Part Salad Oil 1 Part Used Motor Oil

We claim:

1. As an improved additive capable of imparting oil repellency and water repellency to polyethylene terephthalate fibers, a compound of the formula [R(CH$_2$)$_n$—OOC—Ar—COO]$_t$Y, wherein:

"R" is a perfluorinated alkyl or alkoxyalkyl group of 2–20 carbon atoms;
"n" is 2–6;
"Ar" is an ortho- or para-phenylene radical;
"t" is 2–4;
"Y" is the residue of a polyol selected from the group consisting of ethylene glycol, hydroquinone, glycerol, pentaerythritol, CH(CH$_2$OH)$_3$, and HOC(CH$_2$OH)$_3$.

2. Compound of claim 1 wherein the perfluorinated radicals are C$_5$ to C$_{10}$ perfluorinated n-alkyl; or have the formula R$_f$O(CF$_2$)$_n$ where R$_f$ designates C$_1$ to C$_6$ perfluoroalkyl and (CF$_2$)$_n$ is a straight chain C$_2$ to C$_{10}$ diradical.

3. Compound of claim 2 wherein the polyol is pentaerythritol, quadruply acylated by said fluorinated phthalate or terephthalate monoester, and "n" is 2.

4. Compound of claim 2 wherein the polyol is glycerol, doubly acylated by said fluorinated terephthalate monoester.

5. Compound of claim 2 wherein said perfluorinated radical contains a straight chain of at least six perfluorinated carbon atoms; and said polyol is hydroquinone or ethylene glycol.

6. An improved polyethylene terephthalate fiber having incorporated into the fiber surface as an integral part of the fiber, an additive compound of claim 1; whereby the fiber displays oil repellency and water repellency.

7. Fiber of claim 6 wherein said fiber is polyethylene terephthalate and in said compound, the perfluorinated radicals are C$_5$ to C$_{10}$ perfluorinated n-alkyl, or have formula R$_f$O(CF$_2$)$_n$ where R$_f$ designates perfluoroisopropyl and (CF$_2$)$_n$ is a straight chain C$_2$ to C$_{10}$ diradical.

8. Fiber of claim 7 wherein the additive is acylated pentaerythritol, quadruply acylated by said fluorinated phthalate or terephthalate monoester, and the perfluorinated radicals in said additive are attached to ethylene diradicals.

9. Fiber of claim 7 wherein the additive is acylated glycerol, doubly acylated by said fluorinated terephthalate monoester, and the perfluorinated radicals in said additive are attached to ethylene diradicals.

10. Fiber of claim 7 wherein the said perfluorinated radicals in the additive contain a straight chain of at least six perfluorinated carbon atoms and are attached to ethylene diradicals, and the acylated polyol is hydroquinone or ethylene glycol.

11. Process of incorporating an additive of claim 1 into the fiber surface of a polyethylene terephthalate fiber as an integral part of the fiber, which comprises contacting said additive in liquid medium with said fiber and thereafter annealing the resulting fiber at temperature and time conditions sufficient to improve the oil repellency or water repellency of said fiber.

12. Process of claim 11 wherein the fiber is composed of polyethylene terephthalate, and in the compound incorporated therein as an additive, the perfluorinated radicals are C$_5$ to C$_{10}$ perfluorinated n-alkyl, or have formula R$_f$O(CF$_2$)$_n$ where R$_f$ designates perfluoroisopropyl and (CF$_2$)$_n$ is a straight chain C$_2$ to C$_{10}$ diradical.

13. Process of claim 11 wherein the fiber is dyed simultaneously with or after incorporation of said additive therein.

14. Process of claim 13 wherein, in the compound incorporated in the fiber as an additive, the acylated polyol is quadruply acylated pentaerythritol and the perfluorinated radicals are attached to ethylene diradicals.

15. Process of claim 12 wherein, in the compound incorporated in the fiber as an additive, the acylated polyol is doubly acylated glycerol and the perfluorinated radicals are attached to ethylene diradicals.

16. Process of claim 12 wherein, in the compound incorporated in the fiber as an additive, the said perfluorinated radicals contain a straight chain of at least six perfluorinated carbon atoms and are attached to ethylene diradicals, and the acylated polyol is hydroquinone or ethylene glycol.

* * * * *